Nov. 2, 1926.
Z. P. LOYD
1,605,249
SHOCK ABSORBER
Filed May 6, 1922
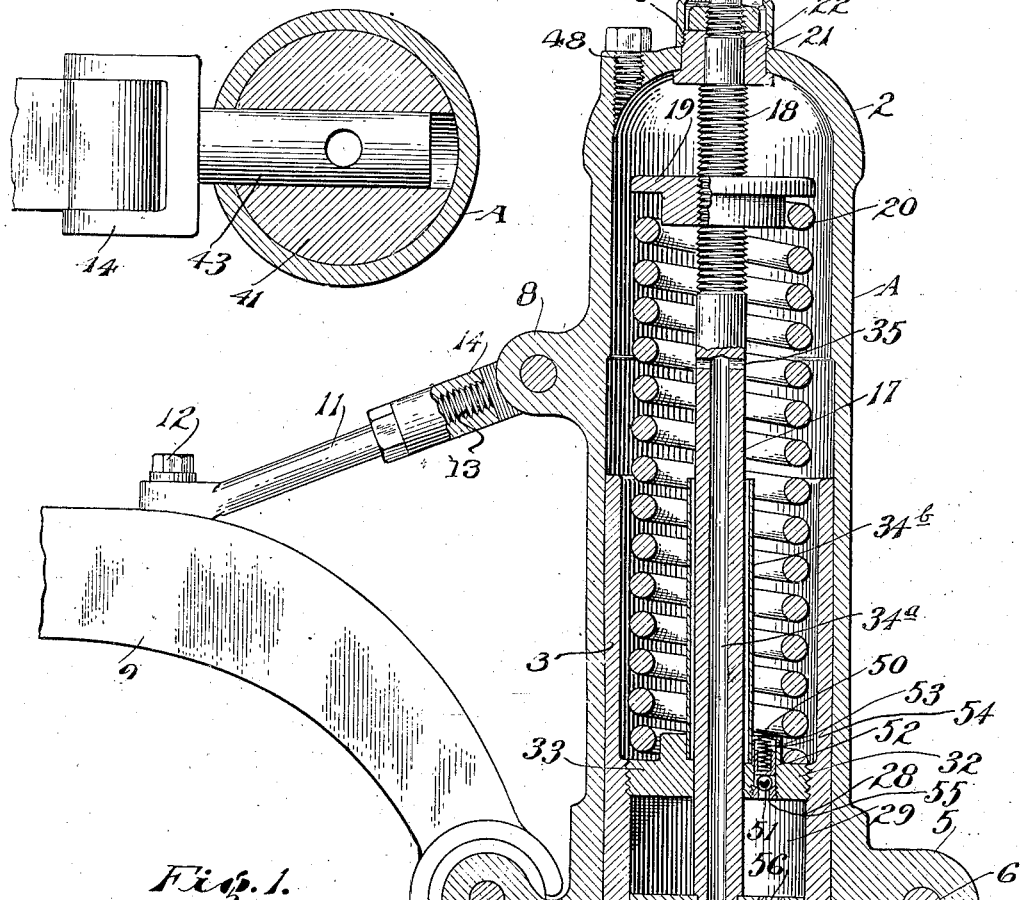
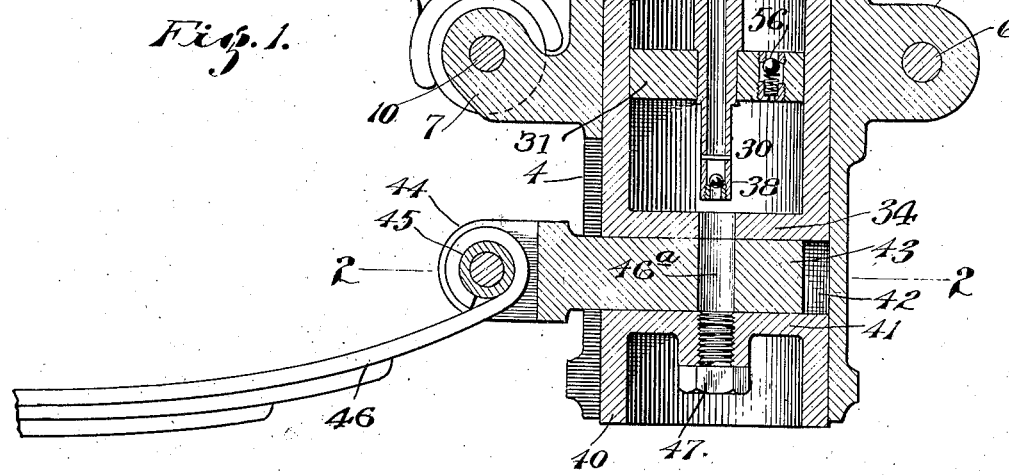
INVENTOR
ZELMERE P. LOYD
BY Drury, Strong, Townsend
and Loftus
ATTY'S.

Patented Nov. 2, 1926.

1,605,249

UNITED STATES PATENT OFFICE.

ZELMERE P. LOYD, OF OAKLAND, CALIFORNIA, ASSIGNOR TO LOYD MANUFACTURING CO., OF OAKLAND, CALIFORNIA, A CORPORATION OF CALIFORNIA.

SHOCK ABSORBER.

Application filed May 6, 1922. Serial No. 559,097.

This invention relates to a shock absorber and especially to improvements on the structure shown in a copending application, entitled "Shock absorber", filed May 11, 1921, Serial No. 468,506.

The object of the present invention is to generally improve and simplify the construction and operation of shock and rebound absorbers; to render the same reliable, durable and efficient in use; comparatively simple and inexpensive to manufacture and above all sensitive and capable of absorbing and dissipating substantially all shocks and vibrations caused by obstructions or undulations in a road surface. The invention also embodies a shock absorber in which the smaller shocks, vibrations and rebound movements are absorbed by spring action, while maximum shock and rebound movement is checked and resisted by pneumatic or dashpot action.

The invention further embodies a shock absorber comprising a main cylinder and piston, and a secondary cylinder and piston, an oil reservoir and a transfer valve cooperating therewith, which functions in such a manner that no oil will escape except when the shock absorber is acting, and then only will a quantity sufficient for lubricating purposes be released, circulated and automatically returned to the reservoir.

The invention further contemplates a structure in which all moving parts, springs, etc., are completely enclosed and dust and water thereby excluded; also a structure which may be readily installed on practically any automobile without cutting the frame or in any way altering the spring connections.

Further objects will hereinafter appear.

The invention consists of the parts and the construction, combination and arrangement of parts as hereinafter more fully described and claimed, having reference to the accompanying drawings, in which—

Fig. 1 is a central, vertical, longitudinal section of the shock absorber showing it attached to an automobile.

Fig. 2 is a cross section on line 2—2, Fig. 1.

Referring to the drawings in detail, A indicates a main cylinder, the upper end of which is closed by a head member 2 suitably secured thereto or formed integral therewith as here illustrated. The lower end of the cylinder is open to permit insertion of an inverted piston generally indicated at 3, and the lower end of the cylinder is also slotted longitudinally as indicated at 4 for purposes to be hereinafter described. Formed on the front side of the cylinder is a lug 5, which is perforated to receive a tie rod 6, and formed on the rear side of the cylinder is a pair of lugs as indicated at 7 and 8; the lug 7 forming a pivotal attachment between the front end of the main frame 9 and the cylinder by the insertion of a pin or bolt 10, while the upper lug 8 forms a means of rigidly securing the cylinder and vertically adjusting the same with relation to the frame by means of a screw rod 11. The rod 11 is secured at one end to the frame by means of a bolt 12, while the opposite end enters a threaded extension 13 formed on a fork-shaped connecting member 14.

Centrally disposed within the main cylinder A is a rod 17. The upper end of this rod is threaded as at 18 to receive a collar or nut 19, between which and a head member 33 in the piston 3 is interposed a helical spring 20. Secured in the upper end of the main cylinder or in the head 2 is a bushing 21. Extending therethrough is an extension 22, which is formed on the upper end of the rod 17. This extension is threaded as at 23 to receive a lock nut 24, and it terminates in a squared end 25 to permit the rod to be turned as will hereinafter be described. The bushing 21 extends a slight distance beyond the upper end of the head 2 and it is threaded as at 26 to receive a dust cap 27. The main piston 3 is, as previously described, inverted. It is reciprocally mounted within the cylinder A and its lower end is bored as at 28 to form a secondary cylinder chamber or dashpot which is divided into two section 29 and 30 by means of an auxiliary piston 31. The upper end of the bore 28 is threaded as at 32 to receive a head member 33 which forms a closure for the chamber 29. A similar closure is formed for the chamber 30 by means of the bottom of the piston indicated at 34. The rod 17 extends through the head member 33 and is secured to the auxiliary piston in any suitable manner. The rod is also provided with a central passage 34ª which terminates in a pair of lateral passages 35 at the upper end, and it is provided with a ball or check valve 38 at the lower end. The lower end 34 of the inverted piston is extended to form a skirt or guide portion 40. It is also considerably reinforced as indicated at 41 to permit it to be drilled as at 42 for the reception of a pin 43 which terminates in a forked extension 44 provided for the reception of the eye 45 of a semi-elliptical or other shaped spring indicated at 46. The pin 43 is pressed or driven into the opening 42, or otherwise secured, and the bottom of the piston, together with the pin, is drilled to form a well or passage 46ª, the lower end of which is closed by means of a plug 47.

The upper end of the main piston receives the main supporting spring 20. It also forms a cup-shaped reservoir, the bottom portion of which is closed by means of the head 33, and a tube 34ᵇ, said reservoir being provided first, for the purpose of receiving the spring 20, and secondly, as a receptacle for a heavy oil or other lubricant which is introduced in any suitable manner.

With the several parts assembled and connected to the main frame 9 and the spring 46, as illustrated in Fig. 1, it can readily be seen that the spring 20 will support the main load of the vehicle; further, that any shocks transmitted to the running gear from the road surface will cause the main piston 3 to reciprocate within the main cylinder against the tension of the spring 20. The adjustable nut or collar 19 carried by the rod 17 permits the tension of the spring 20 to be adjusted to suit varying size vehicles and loads. Such adjustment is readily accomplished by removing the dust cap 27, releasing the lock nut 24, and then engaging the upper squared end of the rod by means of a wrench or the like. A turning movement imparted to the rod will cause the nut 19 to travel up or down on the rod and will thus decrease or increase the tension of the spring.

The lubricant employed is, as previously stated, supplied in any suitable manner, or as here shown through an opening 48, and when so admitted will gradually settle by gravity into the cup-shaped upper end of the main piston where escape thereof is prevented due to the use of the inner tube 34ᵇ. The lubricant will, practically speaking, remain in this reservoir unless means are provided for liberating a portion thereof and for recirculating the same. This is accomplished in the following instance by providing a transfer valve generally indicated at 50. The valve consists of a ball check 51 and a superposed plunger 52, which is held against the ball by means of a spring 53. The ball and the plunger are reciprocally mounted in a chamber, as shown, and this chamber has an inlet and a discharge opening as indicated at 54 and 55. A slight amount of oil is permitted to escape by the plunger and the ball check when the spring is in action and this oil is employed for lubricating purposes. It is however retained against escape when the spring is not in action. The oil escaping by the ball check 51 collects to a slight extent on top of the piston 31 but is permitted to pass this piston through a ball check 56 as shown. The oil thus by-passed settles in the lower end of the piston and collects in the chamber 46ª, where it is permitted to accumulate until a sufficient quantity is collected to permit automatic circulation thereof. The ball checks are, as previously stated, normally retained in engagement with their respective seats by means of the springs, the spring engaging the plunger 52 being weaker or having less tension than the spring which cooperates with the check valve 56, thus permitting the check valve 55 to open first when pressure is created in chamber 29.

During actual operation it can readily be seen that continuous reciprocation of the main piston within the cylinder will take place due to road shocks and undulations encountered when the vehicle is traveling. A certain amount of the oil contained in the reservoir will splash about in the upper end of the cylinder and thus lubricate the adjoining contacting faces, and a small amount will at the same time escape by the ball check 55. This oil is employed for lubricating purposes only and as the oil settles by gravity, it can readily be seen that it will pass by the check 56 and finally collect in the chamber 46ª, from where it is returned to the reservoir by means of the action of the check valve 38, that is excess movement of the main piston will cause the lower end of the rod 18 to enter the well or chamber 46. Any oil contained in the well will thus pass the check 38 and will in this manner gradually pass upwardly through the hollow rod and discharge through the lateral openings 35; the oil being in this manner directed against the inner surface of the cylinder wall, from where it drains downwardly into the reservoir. The moment a vehicle is permitted to stand, check 51 becomes seated and no lubricant can escape. The minor shocks and vibrations encountered when a vehicle is travelling over a road are in this instance absorbed by the spring 20. Excess movement is also partially absorbed by this spring, but the major portion thereof is checked by the auxiliary or secondary piston 31. During inward movement of the main piston 3, compression takes place in the lower chamber 30, while a vacuum is produced in the upper chamber 29. During rebound movement reverse conditions take place. The check valves 51 and 56 are thus alternately subjected to pressures in various directions and a reciprocal movement sufficient to permit the respective valves to leave their seats is imparted, this movement being employed for the purpose of maintaining the lubricating oil in circulation.

For the purpose of securing the main piston 3 against rotation within the main cylinder, a slot 4 has been provided. The pin 43, forming a connection between the semi-elliptical spring and the piston, passes through the slot 4 and is actuated thereby. This pin thus serves the function of securing the piston against turning movement and it will, due to the length of the slot, permit free reciprocal movement of the piston.

The shock absorber here illustrated may be arranged at the front of a vehicle and at the rear thereof. They are in this manner arranged in pairs and in order to properly brace the cylinders with relation to each other, the lugs 5 and the tie rods 6 are employed, that is the rod is passed between the cylinders and through the lugs and bolted thereto, thus cross-bracing the cylinders and rendering the mounting exceedingly rigid.

Having thus described my invention, what I claim and desire to secure by Letters Patent is—

1. A shock absorber comprising a main cylinder, a main piston reciprocally mounted therein, a dashpot chamber formed in the piston, an auxiliary piston mounted in said dashpot, means maintaining a fixed position between the auxiliary piston and the main cylinder, an oil reservoir carried by the main piston, means actuated by movement of said piston for transferring oil in small quantities from the reservoir to the dashpot, and other means for elevating and returning the oil to the reservor.

2. In a shock absorber of the character described, the combination with the main cylinder and the main piston reciprocally mounted therein, of a partition member carried by said piston and dividing the piston into a dashpot and an oil reservoir, an auxiliary piston mounted in the dashpot chamber and maintained stationary with relation to the main cylinder, said auxiliary piston dividing the dashpot into an upper and a lower chamber, means for transferring small quantities of oil from the reservoir to the upper chamber of the dashpot, means for transferring the oil through the auxiliary piston to the lower chamber of the dashpot, and means for elevating the oil from the lower chamber of the dashpot and returning it to the reservoir.

3. In a shock absorber of the character described, the combination with the main cylinder and the main piston reciprocally mounted therein, of a partition member carried by said piston and dividing the piston into a dashpot and an oil reservoir, an auxiliary piston mounted in the dashpot chamber and maintained stationary with relation to the main cylinder, said auxiliary piston dividing the dashpot into an upper and a lower chamber, an oil transferring valve forming communication between the reservoir and the upper dashpot chamber, a valve carried by the auxiliary piston adapted to transfer oil from the upper chamber to the lower chamber of the dashpot, and other means for elevating and transferring the oil from the lower chamber of the dashpot to the reservoir.

4. A shock absorber of the character described, comprising a main cylinder, an inverted piston reciprocally mounted therein, a head member secured in the piston and dividing the piston into a dashpot and an oil reservoir, a spring interposed between said head member and the cylinder, a rod secured to the main cylinder extending through the head member, an auxiliary piston on the lower end of the rod disposed in the dashpot and dividing the dashpot into an upper and a lower chamber, a tube secured to the head member and surrounding the rod, said tube forming the inner wall of the reservoir, an oil transferring valve forming communication between the oil reservoir and the upper dashpot chamber, a transfer valve carried by the auxiliary piston, and means for elevating oil delivered to the dashpot chamber and returning it to the oil reservoir.

ZELMERE P. LOYD.